US012626347B2

(12) United States Patent (10) Patent No.: US 12,626,347 B2

Hou et al. (45) Date of Patent: May 12, 2026

(54) VISUAL INSPECTION TRAINING BOARD FOR ARTIFICIAL INTELLIGENCE DEEP LEARNING

(71) Applicant: International Business Machines Corporation, Armonk, NY (US)

(72) Inventors: YanLong Hou, Shenzhen (CN); WeiFeng Zhang, Shenzhen (CN); Wei Wang, Shenzhen (CN); Jiayu Zheng, Foshan (CN)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 18/155,245

(22) Filed: Jan. 17, 2023

(65) Prior Publication Data

US 2024/0242328 A1      Jul. 18, 2024

(51) Int. Cl.
  *G06T 7/00*      (2017.01)

(52) U.S. Cl.
  CPC .. *G06T 7/0004* (2013.01); *G06T 2207/20081* (2013.01); *G06T 2207/30141* (2013.01); *G06T 2207/30152* (2013.01)

(58) Field of Classification Search
  CPC ......... G06T 7/0004; G06T 2207/20081; G06T 2207/30141; G06T 2207/30152
  USPC ................................. 382/100, 103
  See application file for complete search history.

(56) References Cited

U.S. PATENT DOCUMENTS

2018/0293722 A1*  10/2018  Crocco ................. G06V 10/82
2022/0077072 A1*   3/2022  Yu ...................... H01L 25/0652

FOREIGN PATENT DOCUMENTS

CN        109406529 A     3/2019
CN        110346704 A    10/2019
WO    WO-2022180625 A1 *  9/2022  ............. G06F 18/24

OTHER PUBLICATIONS

Adibhatla, et al, "Defect Detection in Printed Circuit Boards Using You-Only-Look-Once Convolutional Neural Networks", Electronics, 2020, 16 pages.
Dai, et al, "Soldering defect detection in automatic optical inspection", Nanyang Technological University, Singapore, Elsevier, 2019, 9 pages.

(Continued)

*Primary Examiner* — Sheela C Chawan
(74) *Attorney, Agent, or Firm* — Cantor Colburn LLP; Stephen Yoder

(57)          ABSTRACT

A computing system includes an automatic optical inspection (AOI) and a database that stores images of a plurality of visual inspection (VI) training boards. Each of the visual inspection (VI) training boards includes at least one intended defect. The AOI system includes an artificial intelligence (AI) algorithm implemented in an automatic optical inspection (AOI) system. The AOI system trains the AI algorithm to learn at least one target defect based on the at least one intended defect including in the plurality of VI training boards, analyzes a production printed circuit board (PCB), and determines either a non-defective PCB in response to the AI algorithm determining the production PCB excludes the at least one target defect, or a defective PCB in response to the AI algorithm determining the production PCB includes at least one target defect.

18 Claims, 13 Drawing Sheets

(56) References Cited

OTHER PUBLICATIONS

Wang, et al, "A Machine Vision Based Automatic Optical Inspection System for Measuring Drilling Quality of Printed Circuit Boards", IEEE, vol. 5, 2017, 18 pages.

Zhang, "PDN modeling for high-speed multilayer PCB boards and decap optimization using machine learning techniques", Scholars' Mine, Missouri S&T Library and Learning Resources, 2021, 88 pages.

* cited by examiner (Along line 3-3)

(Top View)

(Along line 2-2)

(Top View)

(Along line 1-1)

(Top View)

Extreme excessive solder condition

Extreme insufficient solder condition

Normal solder condition

VISUAL INSPECTION TRAINING BOARD FOR ARTIFICIAL INTELLIGENCE DEEP LEARNING

BACKGROUND

The present invention generally relates to computer systems, and more specifically, to computer systems, computer-implemented methods, and computer program products for using visual inspection training boards to perform artificial intelligence deep learning.

An automatic optical inspection (AOI) device is common tool used in electronics manufacturing for various printed circuit board (PCB) assembly tasks. The AOI device typically implements an AOI judgement algorithm which facilitates inspection of various PCB assembly errors including, but not limited to, incorrect component placement, missing components, solder misregistrations, solder open defects (also referred to as solder opens), and solder short defects (also referred to a solder shorts).

The conventional AOI judgement algorithm implemented by traditional AOI tools provides no intelligence. Consequently, if the judgement criteria is loosened or relaxed, more defects go undetected. On the other, if the judgement criteria is tightened or more strict, all or almost all defects can be detected. These increased detections may also include an increase in false call points or "false positive." These false positive result in the need to employ a second inspection stage that is performed by a human inspector. When performing the manual inspection for a common PCB board, the inspector may have to review and inspect hundreds of contact points, component placements and/or solder deposits, which is extremely time consuming and susceptible to human error allowing for a missed defect.

SUMMARY

One or more non-limiting embodiments of the present invention are directed to a computer-implemented method for using visual inspection training boards to perform artificial intelligence deep learning. The method includes producing a plurality of visual inspection (VI) training boards, where each of the visual inspection (VI) training boards including at least one intended defect, and training an artificial intelligence (AI) algorithm implemented in an automatic optical inspection (AOI) system to learn at least one target defect using the plurality of VI training boards. The method further includes analyzing a production printed circuit board (PCB) using the AOI system, and determining one of a non-defective PCB in response to the AI algorithm determining the production PCB excludes the at least one target defect, or a defective PCB in response to the AI algorithm determining the production PCB includes at least one target defect.

According to one or more non-limiting embodiments, the method further includes wherein producing the plurality of visual inspection (VI) training boards comprises one or both of assembling a physical VI training board including the at least one intended defect and computer-generating a virtual VI training board including the at least one intended defect.

According to one or more non-limiting embodiments, the method further includes generating, by the AOI system, an alert indicating a detection of the defective PCB.

According to one or more non-limiting embodiments, the method further includes the at least one target defect included in the production PCB is unintentionally formed.

According to one or more non-limiting embodiments, the method further includes the at least one intended defect and the at least one target defect includes one or more of an incorrect component placement, a missing component, solder misregistrations, a solder open defect, and a solder short defect.

According to one or more non-limiting embodiments, the method of training the AI algorithm comprises capturing an image of each physical VI training board among the plurality of VI training boards, and inputting the images of the plurality of VI training boards into a training engine. The training method further includes assigning a known label to the at least one intended defect included in a given physical VI training board among the plurality of VI physical boards, and making a prediction for classifying the images of the plurality of VI physical training boards based on the known label. The training method further includes comparing the prediction to a base model image of a PCB that excludes the at least one intended defect, and updating the AI algorithm based on results of the comparison.

According to one or more non-limiting embodiments, the method of training the AI algorithm includes inputting images of the virtual VI training board among the plurality of VI training boards into the training engine, and assigning a known label to the at least one intended defect included in a given virtual VI training board among the plurality of VI training boards. The training method further includes making a prediction for classifying the images of the plurality of VI virtual training boards based on the known label, comparing the prediction to a base model image of a PCB that excludes the at least one intended defect, and updating the AI algorithm based on results of the comparison.

According to another non-limiting embodiment of the invention, a computing system comprises a database and an automatic optical inspection (AOI) system. The database is configured to receive images of a plurality of visual inspection (VI) training boards, where each of the visual inspection (VI) training boards including at least one intended defect. The automatic optical inspection (AOI) system includes an artificial intelligence (AI) algorithm implemented in an automatic optical inspection (AOI) system. The automatic optical inspection (AOI) system is configured to train the artificial intelligence (AI) algorithm to learn at least one target defect based on the at least one intended defect including in the plurality of VI training boards, analyze a production printed circuit board (PCB), determine either a non-defective PCB in response to the AI algorithm determining the production PCB excludes the at least one target defect, or a defective PCB in response to the AI algorithm determining the production PCB includes at least one target defect.

According to one or more non-limiting embodiments, the plurality of visual inspection (VI) training boards comprises assembling a physical VI training board including the at least one intended defect and/or a computer-generated virtual VI training board including the at least one intended defect.

According to one or more non-limiting embodiments, the AOI system generates an alert indicating a detection of the defective PCB.

According to one or more non-limiting embodiments, the at least one target defect included in the production PCB is unintentionally formed.

According to one or more non-limiting embodiments, the at least one intended defect and the at least one target defect includes one or more of an incorrect component placement, a missing component, solder misregistrations, a solder open defect, and a solder short defect.

According to one or more non-limiting embodiments, the AOI system trains the AI algorithm by performing the operations of capturing an image of each physical VI training board among the plurality of VI training boards, and inputting the images of the plurality of VI training boards into a training engine. The training method further comprises assigning a known label to the at least one intended defect included in a given physical VI training board among the plurality of VI physical boards, and making a prediction for classifying the images of the plurality of VI physical training boards based on the known label. The method further comprises comparing the prediction to a base model image of a PCB that excludes the at least one intended defect, and updating the AI algorithm based on results of the comparison.

According to one or more non-limiting embodiments, the AOI system trains the AI algorithm by performing the operations inputting images of the virtual VI training board among the plurality of VI training boards into the training engine, and assigning a known label to the at least one intended defect included in a given virtual VI training board among the plurality of VI training boards. The training method further comprises making a prediction for classifying the images of the plurality of VI virtual training boards based on the known label, comparing the prediction to a base model image of a PCB that excludes the at least one intended defect, and updating the AI algorithm based on results of the comparison.

One or more non-limiting embodiments of the present invention are directed to a computer-implemented method for using visual inspection training boards to perform artificial intelligence deep learning. The method includes producing a plurality of visual inspection (VI) training boards, where each of the visual inspection (VI) training boards including at least one intended defect, and training an artificial intelligence (AI) algorithm implemented in an automatic optical inspection (AOI) system to learn at least one target defect using the plurality of VI training boards. The method further includes analyzing a production printed circuit board (PCB) using the AOI system, and determining one of a non-defective PCB in response to the AI algorithm determining the production PCB excludes the at least one target defect, or a defective PCB in response to the AI algorithm determining the production PCB includes at least one target defect.

According to one or more non-limiting embodiments, the method further includes wherein producing the plurality of visual inspection (VI) training boards comprises one or both of assembling a physical VI training board including the at least one intended defect and computer-generating a virtual VI training board including the at least one intended defect.

According to one or more non-limiting embodiments, the method further includes generating, by the AOI system, an alert indicating a detection of the defective PCB.

According to one or more non-limiting embodiments, the method further includes the at least one target defect included in the production PCB is unintentionally formed.

According to one or more non-limiting embodiments, the method further includes the at least one intended defect and the at least one target defect includes one or more of an incorrect component placement, a missing component, solder misregistrations, a solder open defect, and a solder short defect.

According to one or more non-limiting embodiments, the method of training the AI algorithm comprises capturing an image of each physical VI training board among the plurality of VI training boards, and inputting the images of the plurality of VI training boards into a training engine. The training method further includes assigning a known label to the at least one intended defect included in a given physical VI training board among the plurality of VI physical boards, and making a prediction for classifying the images of the plurality of VI physical training boards based on the known label. The training method further includes comparing the prediction to a base model image of a PCB that excludes the at least one intended defect, and updating the AI algorithm based on results of the comparison.

According to one or more non-limiting embodiments, the method of training the AI algorithm includes inputting images of the virtual VI training board among the plurality of VI training boards into the training engine, and assigning a known label to the at least one intended defect included in a given virtual VI training board among the plurality of VI training boards. The training method further includes making a prediction for classifying the images of the plurality of VI virtual training boards based on the known label, comparing the prediction to a base model image of a PCB that excludes the at least one intended defect, updating the AI algorithm based on results of the comparison.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
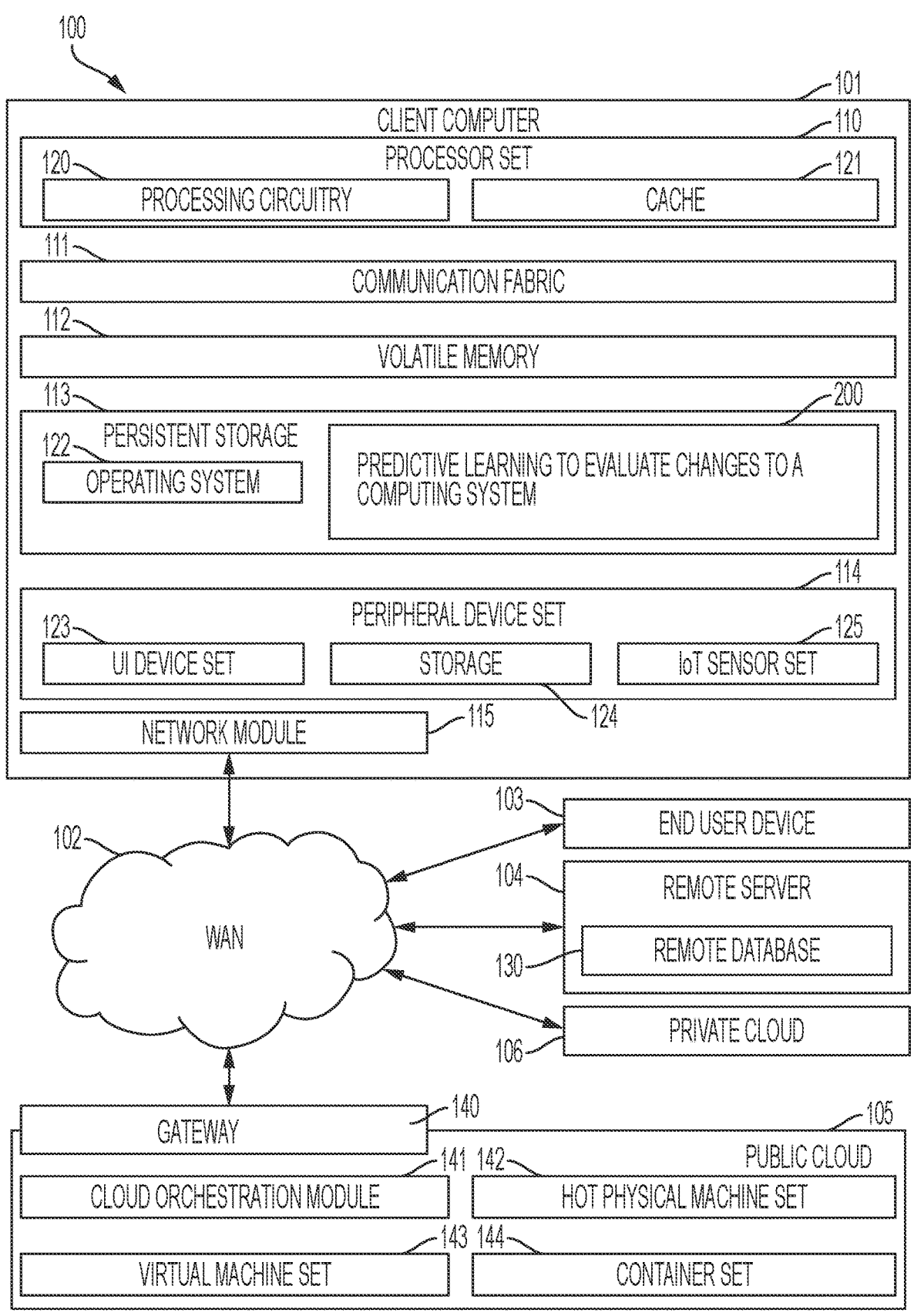
FIG. 1 depicts a block diagram of an example computer system for use in conjunction with one or more embodiments of the present invention according to a non-limiting embodiment of the invention.

Various non-limiting embodiments of the invention provides a system and method for using visual inspection training boards to perform artificial intelligence deep learning that facilitates PCB defect inspection. Rather than wait to encounter a faulty board following a manual inspection, the system and method according to one or more non-limiting embodiments of the invention utilize visual inspection (VI) training boards which include known, intended defects including but are not limited to, incorrect component placements, missing components, solder misregistrations, solder open defects and solder short defects. The VI training boards can include physically assembled boards or computer-generated images of a VI training boards (e.g., virtual VI training boards). The VI training board includes specific types and/or locations of the intended defects, which are known and pre-determined. A multitude of different VI training boards can be produced with a variety of defect types and/or defect locations. These VI training boards are then used to train an artificial intelligence (AI) AOI system which implements an AI AOI algorithm capable of identifying various board defects.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, a computing environment 100 capable of using visual inspection training boards to perform artificial intelligence deep learning that facilitates PCB defect inspection is illustrated according to a non-limiting embodiment. The computing environment 100 contains an example of an environment for the execution of at least some of the computer code involved in performing the inventive methods, such training an AOI AI judgement algorithm based on VI training boards to perform artificial intelligence deep learning that facilitates PCB defect inspection. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, cameras, image scanners, and haptic devices. The cameras and/or image scanner can be used to capture images of physically assembled VI training boards which include specific types and/or locations of the intended defects, which are known and pre-determined. The physically assembled VI training boards can be uploaded to the computer 101, where they are used to train an AOI AI judgement algorithm implemented in an AOI tool or AOI system and perform artificial intelligence deep learning that facilitates PCB defect inspection.

Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. In one or more non-limiting embodiments, a user can operate the EUD 103 to produce computer-generated images of a VI training boards (e.g., virtual VI training boards). The VI training board includes specific types and/or locations of the intended defects, which are known and pre-determined. The computer-generated VI training boards can be uploaded to the computer 101, where they are used to train an AOI AI judgement algorithm and perform artificial intelligence deep learning that facilitates PCB defect inspection.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
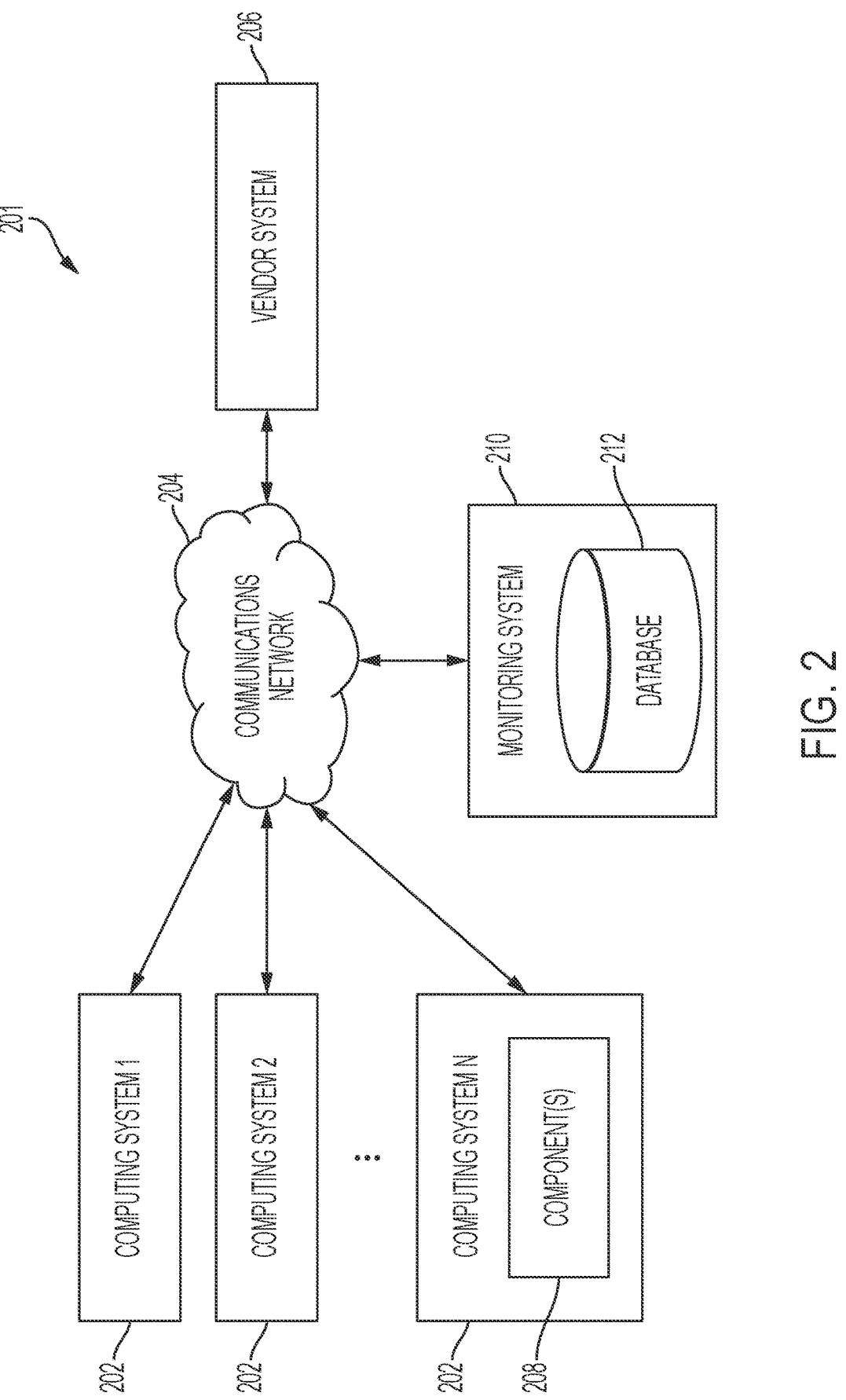
FIG. 2 is a block diagram of a system for use in conjunction with one or more embodiments of the present invention according to a non-limiting embodiment of the invention.

Referring now to FIG. 2, a block diagram of a system 201 for use in conjunction with one or more embodiments of the present invention is shown. In exemplary embodiments, the system 201 includes a plurality of computing systems 202 that each include a plurality of components 208. In exemplary embodiments, the computing systems 202 may be a personal computer, a mobile device, a computer 101 as shown in FIG. 1, or the like. In exemplary embodiments, the components 208 include one or more pieces of hardware and/or one or more pieces of software. The system 201 also includes a vendor system 206 that is configured to provide an update to one or more of the components 208 on the plurality of computing systems 202.

In exemplary embodiments, the system 201 also includes AOI system 210 that includes a database 212. In exemplary embodiments, the computing system 202 is embodied in a computer 101 as shown in FIG. 1. The plurality of computing systems 202, the vendor system 206, and the system AOI system 210 are configured to communicate with one another via a communications network 204, such as the Internet.

In exemplary embodiments, the AOI system 210 is configured to receive and store, in the database 212, data regarding VI training boards. For example, the database 212 can store images of physically assembled VI training boards and/or computer-generated images of a VI training boards (e.g., virtual VI training boards), both which include specific types and/or locations of the intended defects, which are known and pre-determined. In exemplary embodiments, the AOI system 210 is further configured to use the assembled VI training boards and/or virtual VI training boards to train an AOI AI judgement algorithm and perform artificial intelligence deep learning that facilitates PCB defect inspection.

Figure 3:
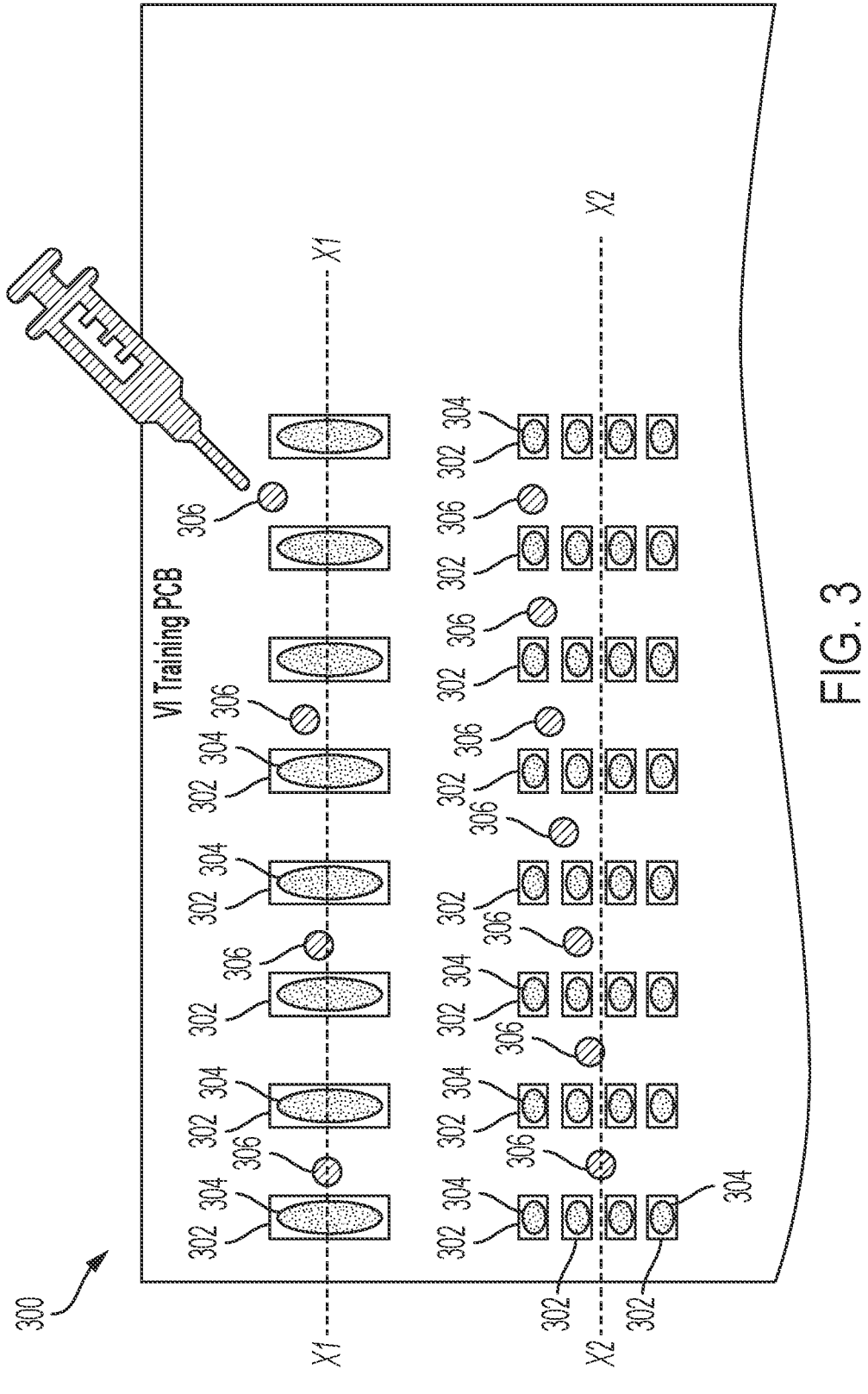
FIG. 3 depicts a physical VI training board at an intermediate stage of assembly according to a non-limiting embodiment of the invention.

Referring now to FIG. 3, a physical VI training board 300 in an intermediate stage of assembly is illustrated according to a non-limiting embodiment of the invention. In the present disclosure, an "intermediate" VI training board is defined as a VI training board in a stage of assembly or virtual creation prior to the completing assembly of the VI training board. As described herein, the VI training board 300 can be assembled to include specific types and/or locations of the intended defects, which are known and pre-determined. Accordingly, the completed VI training board 300 can be used to train an AOI AI judgement algorithm and perform artificial intelligence deep learning that facilitates PCB defect inspection.

The physical VI training board 300 includes one or more pads 302 configured to support an placed electronic device or component. The pads 302 include a material such as metal, for example, configured to receive solder 304 deposited thereon. Deposition of the solder 304 can be automated (e.g., by pick-and-place machine) or manually. The physical VI training board 300 is not limited to any particular number of pads 302. In addition, although the VI training board 300 is shown as having two rows of pads 302, it should be appreciated the VI training board 300 can have more or less rows without departing from the scope of the invention.

The physical VI training board 300 is further configured to receive one or more alignment indicators 306. The alignment indicators 306 are utilized to place an electronic component (not shown in FIG. 3) in a targeted alignment with respect to reference axis (X1, X2, Xn). In one or more non-limiting embodiments, the alignment indicator 306 can be a paint indicator, and adhesive indicator (e.g., glue), or other type of indicator such as a quick read (QR) code, and is deposited on the VI training board 300 by an assembler (e.g., either a machine or a human). In one or more non-limiting embodiments, the alignment indicator 306 can include a material, substance, and/or indicator that can be identified by an automated Surface-mount tool (e.g., a pick-and-place material). In this manner, an electronic component (e.g., the center of the component) can be aligned with respect to a respective alignment indicator 306 to achieve a targeted alignment of the electrical component 308 with respect to a respective reference axis X1, X2.

Figure 4:
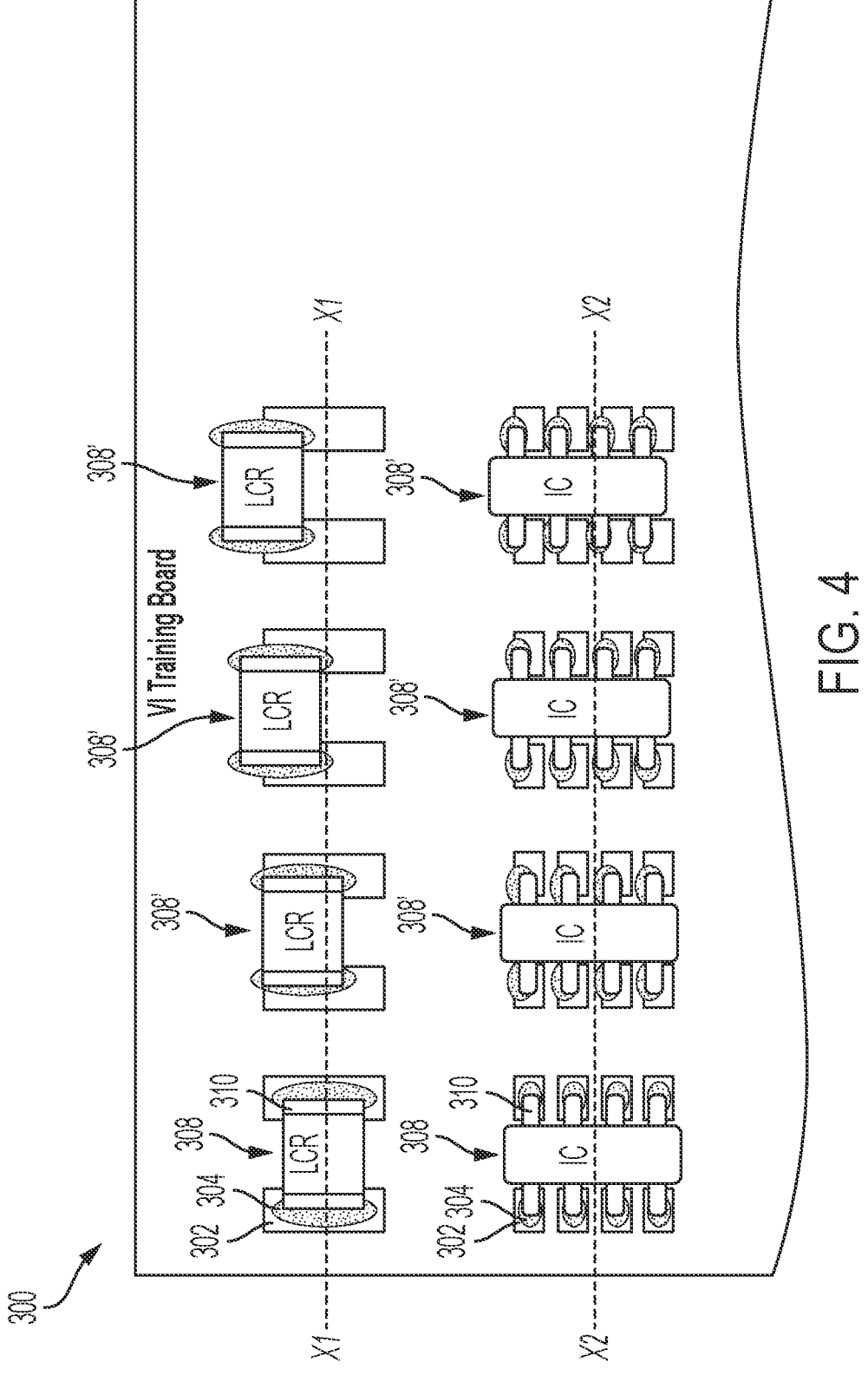
FIG. 4 depicts a completed a completed physical VI training board following placement of electronic components on the VI training board which includes one or more intended defects according to a non-limiting embodiment of the invention.

Turning to FIG. 4, a completely assembled physical VI training board 300 is illustrated following the placement of electrical components 308. Placement of the electrical components 308 can be automated (e.g., by pick-and-place machine) or manually placed by a technician. As described herein, the electrical components 308 are placed on the board 300 such that a component terminal 312 is coupled to a respective solder mound 304 and are aligned with respect to a corresponding alignment indicator 306. In this manner, one or more components 308 can be intentionally placed at an ideal or correct location on the board (e.g., with the center of the component aligned along a reference axis X1, X2) and one or more components 308 can be intentionally misaligned with reference axis X1, X2). In this manner, the assembled physical VI training board 300 can be utilized to train an AOI judgement algorithm to learn and distinguish between an ideal or correct placement of an electrical component 308 and a misaligned or incorrect placement of an electrical component 308'.

The VI training boards described herein can also be assembled or virtually produced to train an AOI judgement algorithm to learn and distinguish between an ideal or correct solder defects or the improper deposition of solder on a PCB board. In terms of a physically assembled VI training board 300, a soldering stencil (sometimes referred to as a "solder mask") 350 can be used to facilitate deposition of ideal or correctly deposited solder 304 and incorrectly deposited solder 304.

Figure 5:
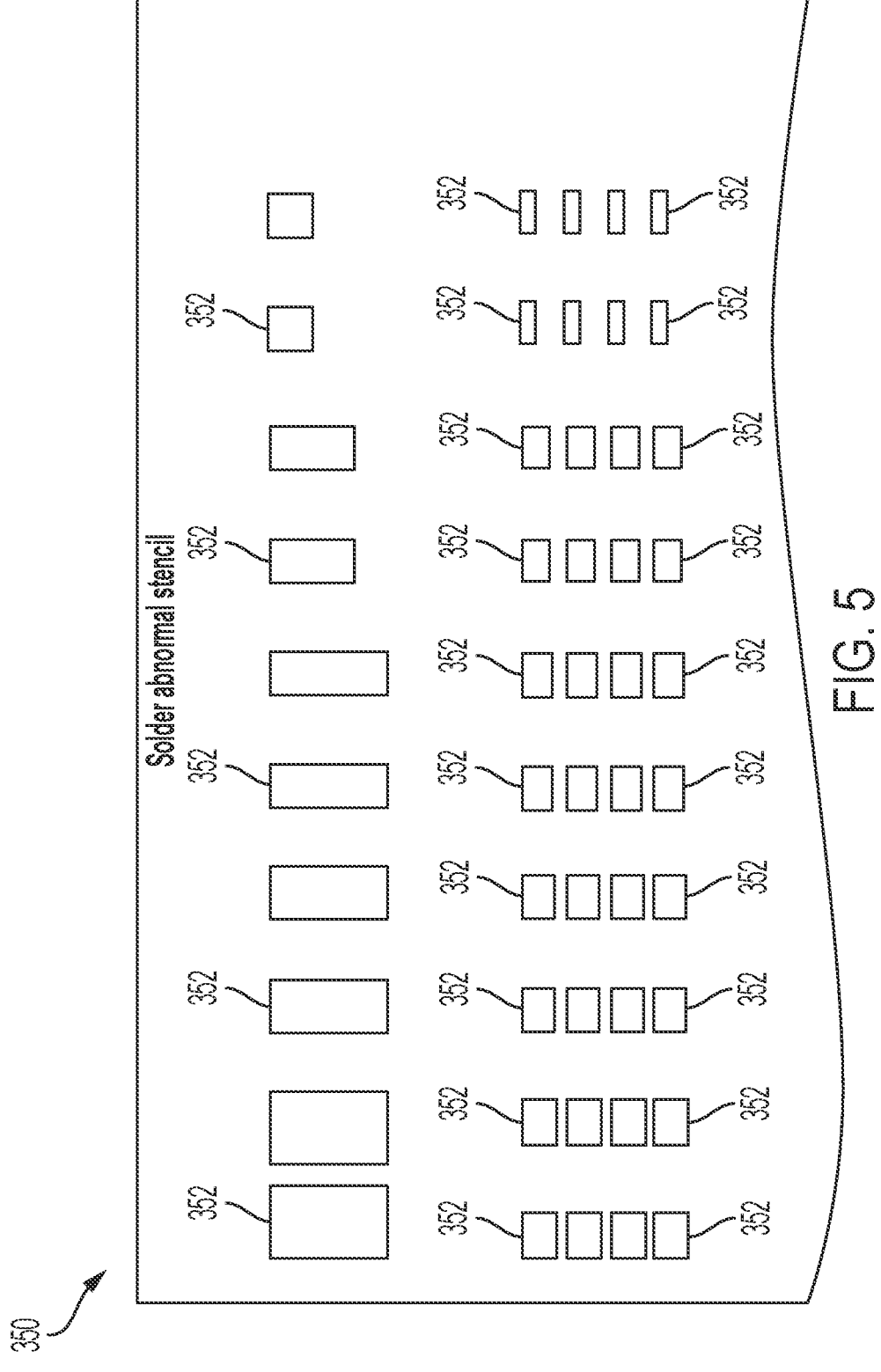
FIG. 5 depicts a solder stencil configured to establish intended solder defects in a physical VI training board according to a non-limiting embodiment of the invention.

Referring to FIG. 5, for example, a soldering stencil 350 can be produced which is patterned to define one or more openings 352. The position of the openings 352 correspond to pads 302 which are to receive solder 304, and the size of the openings determine the amount of solder 304 to deposit on the pads 302. One or more of the openings 352 are sized and positioned so that the ideal or correct amount of solder 304 is deposited at the ideal or correct location on the pad 302, while one or more of the openings 352 are sized and/or positioned incorrectly so that an incorrect amount of solder 304 is deposited on the pad 302 (e.g., (e.g., solder is underfilled or overfilled on the pad 302) and/or the solder 304 is deposited at an incorrect location on the pad 302 (e.g., solder 304 is misaligned with respect to the pad 302).

Figure 6:
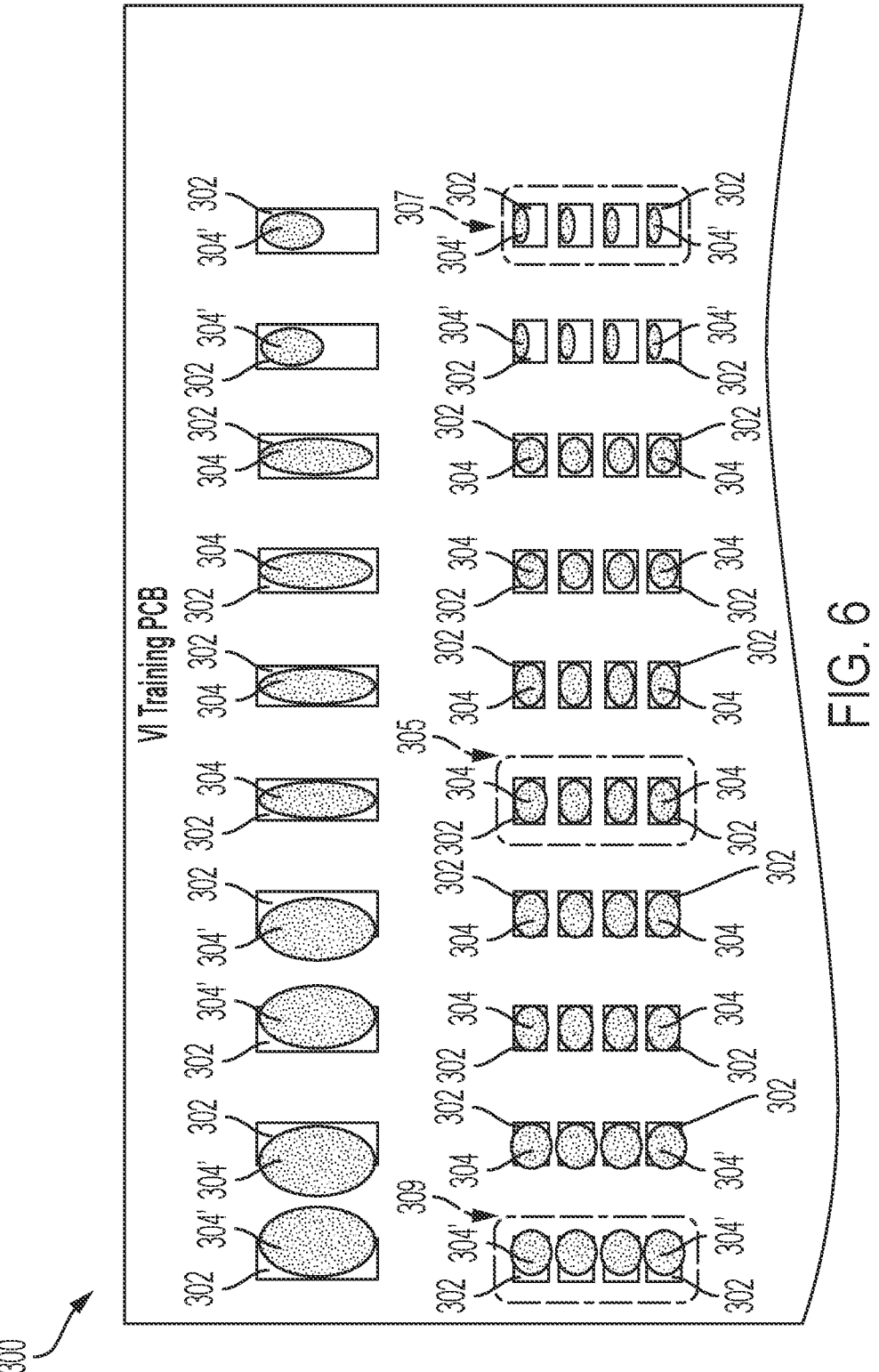
FIG. 6 depicts a physical VI training board after depositing solder mounds on a physical VI training board using a solder stencil according to a non-limiting embodiment of the invention.

Turning to FIG. 6, the VI training board 300 is illustrated after depositing solder 304 onto the pads 302 using the corresponding soldering stencil 350 shown in FIG. 5. The patterned openings 352 of the solder stencil 350 results in solder mounds 304 deposited with the correct amount of solder and at the correct location of the pad 302, along with solder mounds 304' deposited with an incorrect amount of solder (e.g., over-filled solder or under-filled solder) and/or deposited at an incorrect location of the pad 302 (e.g., misaligned with a center of the pad 302). For example, a first board region 305 includes solder mounds 304 deposited with the correct amount of solder and at the correct location of the pads 302. A second board region 307 includes under-filled solder mounds 304' deposited with an sufficient amount of solder. A third board region 309 includes over-filled solder mounds 304' deposited with an excessive amount of solder.

Figure 7:
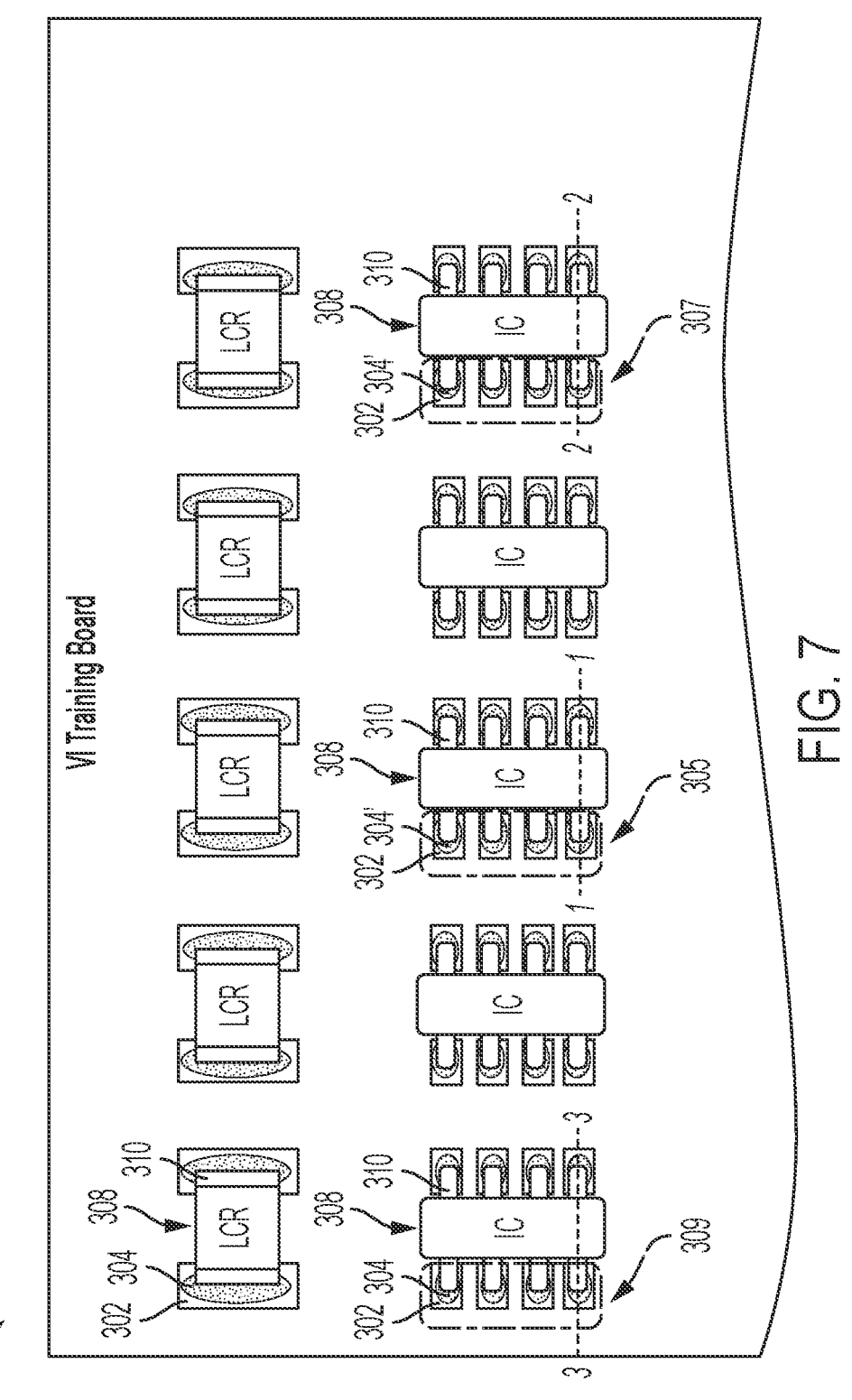
FIG. 7 depicts a physical VI training board following placement of electronic components on the solder mounds deposited on the VI training board shown in FIG. 6 according to a non-limiting embodiment of the invention.
Figures 8A, 8B, 9A, 9B, 10A, 10B:
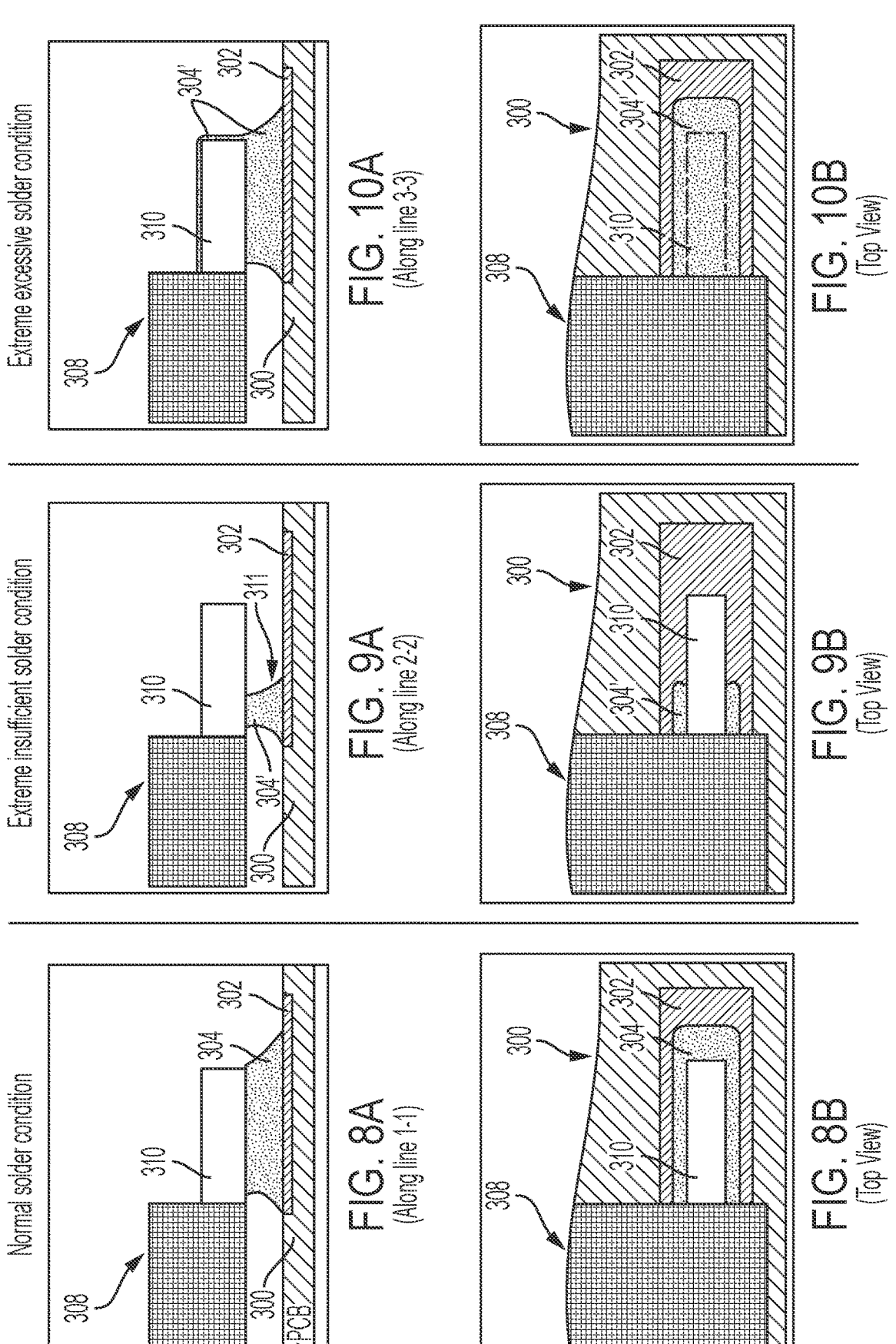
FIGS. 8A and 8B depict a cross-section taken along line 1-1 of an electrical component included in the VI training board shown in FIG. 7 according to a non-limiting embodiment of the invention.
FIGS. 9A and 9B depict a cross-section taken along line 2-2 of an electrical component included in the VI training board shown in FIG. 7 according to a non-limiting embodiment of the invention.
FIGS. 10A and 10B depict a cross-section taken along line 3-3 of an electrical component included in the VI training board shown in FIG. 7 according to a non-limiting embodiment of the invention.

Referring to FIG. 7, the VI training board 300 is illustrated after placing electrical components 308 on the pads 302. The electrical components 308 are placed by disposing the component terminals 310 on the respective solder mounds 304 and 304'. FIGS. 8A and 8B show an electronic component 308 placed in the first board region 305. Accordingly, the terminals 310 disposed on the solder mounds 304 are coupled to the underlying pad 302 using a correct amount of solder. In other words, the solder mound 304 contacts the entire terminal 310, or substantially the entire terminal 310, without over-flowing or covering the sides and top of the terminal 310.

FIGS. 9A and 9B show an electronic component 308 placed in the second board region 305. The terminals 310 in this region 307, however, are disposed on the solder mounds 304' using an insufficient amount of solder. In other words, the solder mounds 304' fail to contact the entire terminal 310, or fail to contact a substantial area of the terminal 310. In some instances the insufficient amount of solder can cause the formation of a cavity 311 between the terminal 310 and the pad 302, which reduces the conductivity and/or produces an open circuit.

FIGS. 10A and 10B show an electronic component 308 placed in the third board region 305. The terminals 310 in this region 307 are disposed on the solder mounds 304' using an excessive amount of solder. In some instances the excessive amount of solder 304' can completely cover or encapsulate the terminal 310, which can produce a short-circuit with one or more electrical components located near the solder mound 304'.

As described herein, VI training boards 300 intentionally assembled to include one or more correctly deposited solder mounds 304 and one or more incorrectly deposited solder mounds 304' can be utilized to train an AOI judgement algorithm to learn and distinguish between an ideal or correct deposition of solder 304 and an incorrect deposition of solder 304' (e.g. an under-filled solder mound and/or an over-filled solder mound). According to one or more non-limiting embodiments of the invention, a multitude (e.g., thousands) of different VI training boards 300 can be assembled in the manner described above. Images of the assembled VI training boards 300 can be captured and stored in a database (e.g., database 212). In this manner, the VI training boards 300 can be utilized to train an AOI AI judgement algorithm and perform artificial intelligence deep learning that facilitates PCB defect inspection without having to wait for an actual faulty board to be identified following a manual inspection.

Figure 11:
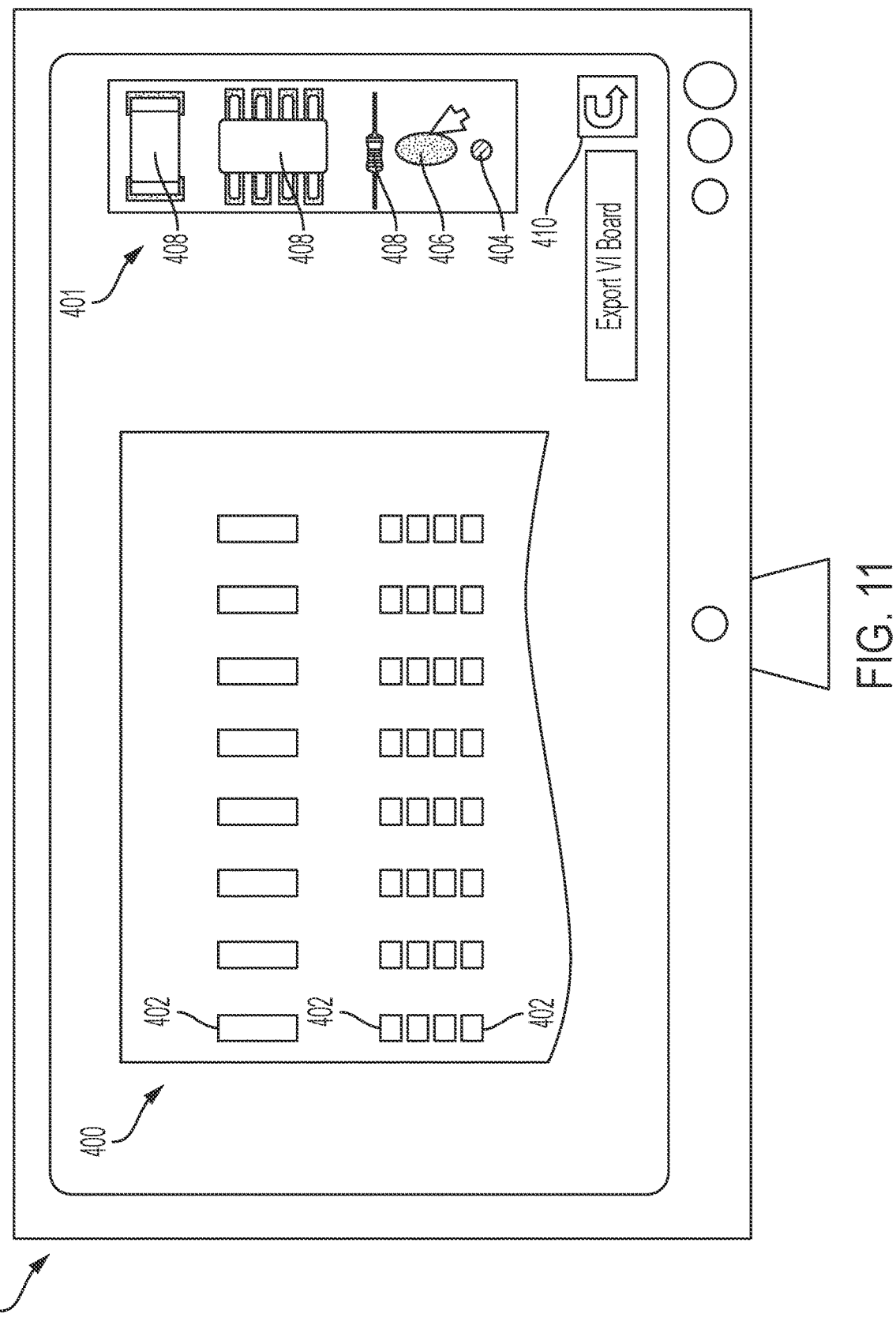
FIG. 11 depicts a computer-generated virtual VI training board at an intermediate stage of assembly according to a non-limiting embodiment of the invention.
Figure 12:
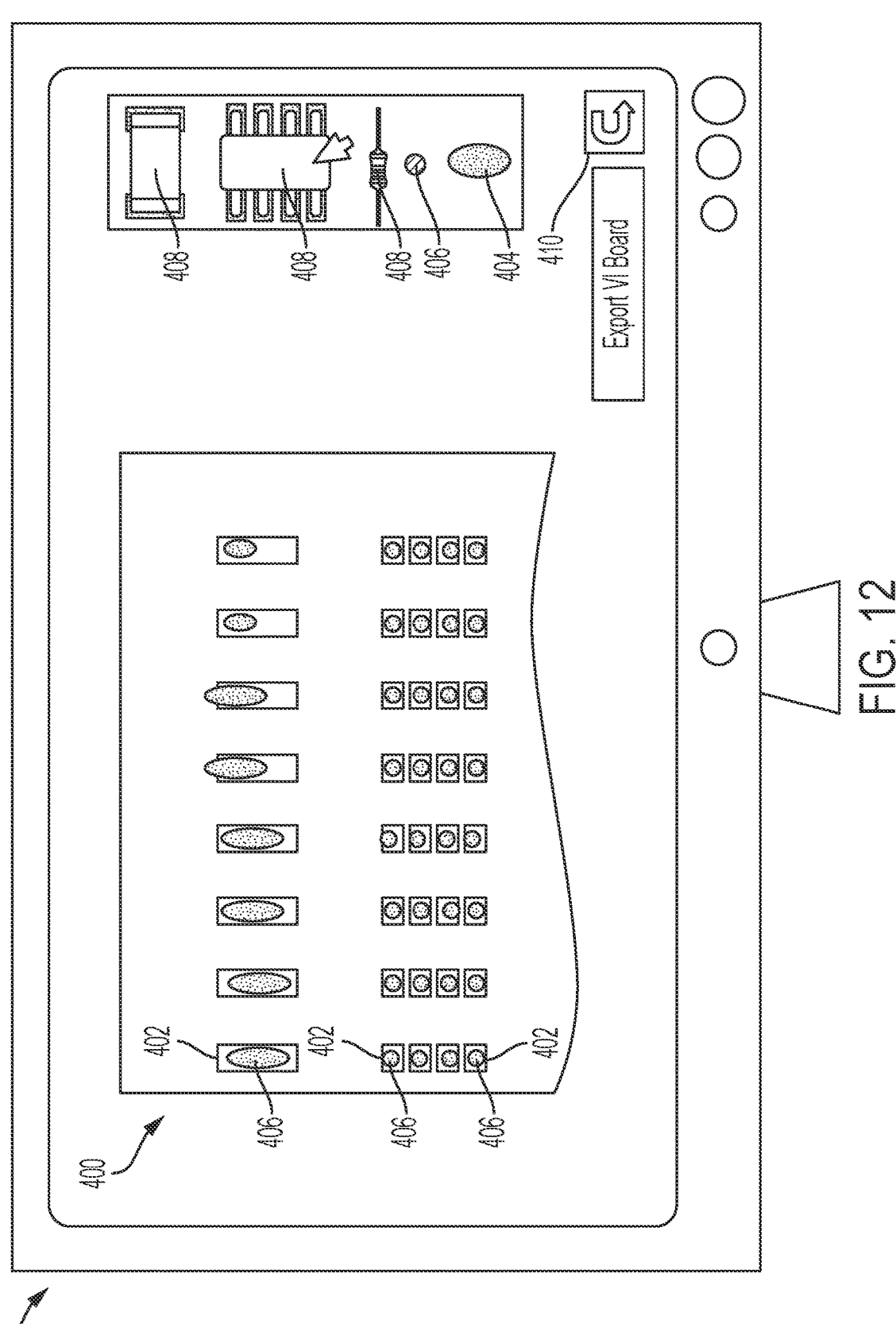
FIG. 12 depicts the computer-generated virtual VI training board show in FIG. 12 after providing at an intermediate stage of assembly according to a non-limiting embodiment of the invention.
Figure 13:
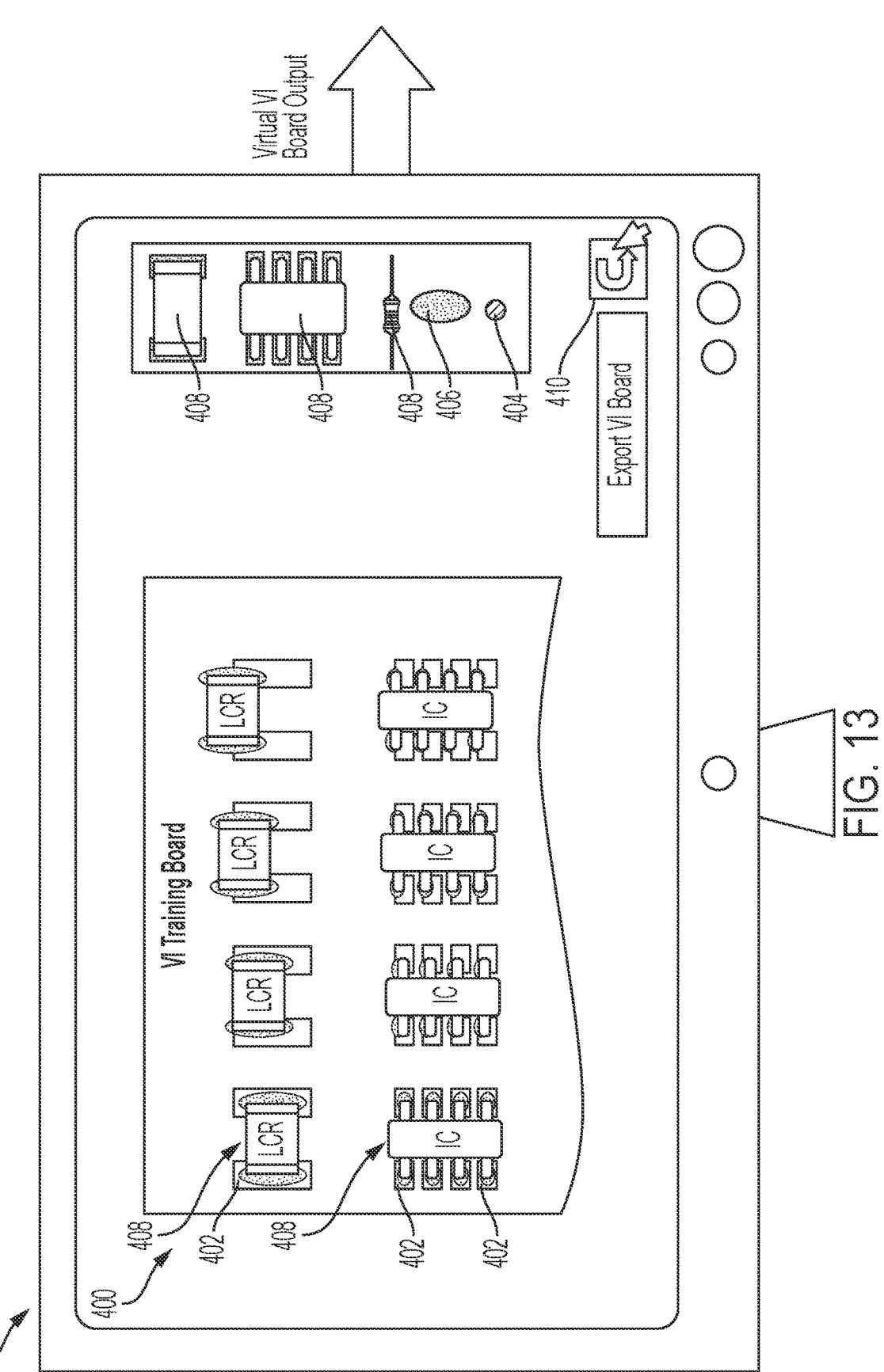
FIG. 13 depicts the computer-generated virtual VI training board show in FIG. 12 after placing solder on solder pads according to a non-limiting embodiment of the invention.

With reference now to FIGS. 11, 12 and 13, a computer-generated VI training board 400 is illustrated according to a non-limiting embodiment of the invention. As described herein, the VI training board 400 can be "assembled" or generated using a computer system (e.g., computing system 100) to include specific types and/or locations of the intended defects, which are known and pre-determined. Accordingly, the completed VI training board 400 can be used to train an AOI AI judgement algorithm and perform artificial intelligence deep learning that facilitates PCB defect inspection.

In FIG. 11, an intermediate computer-generated VI training board 400 displayed on a display screen included in a UI device set 123 is illustrated according to a non-limiting embodiment of the invention. In the present disclosure, an "intermediate" VI training board is defined as a VI training board in a stage of virtual creation prior to reaching the fully completed VI training board. The display include in the UI device set 123 displays the intermediate computer-generated VI training board 400 along with a component library 401 and an export command button 410. The component library 401 lists various design components that can be selected by a user operating the UI device set 123 and "placed" the computer-generated VI training board 400. The design components include, but art not limited to, solder mounds 404, alignment indicators 406 and various types of electronic components 408.

The computer-generated VI training board 400 includes one or more pads 402. As shown in FIG. 12, a user can select one or more solder mounds 404 from the component library 401, adjust the size, orientation, and/or shape of the solder mound 404, and "place" (e.g., click and drag) it at location on the board 300 such as, for example, on a corresponding pad 402. The user can further adjust the alignment of the solder mound 404 with respect to the pad 302 so as to produce an ideal or correctly "deposited" solder mound 304 or an incorrectly deposited solder mound 304.

Likewise, as shown in FIG. 13 a user can select one or more electrical components 308 from the component library 401, adjust the size and/or orientation of the electrical component 308, and "place" (e.g., click and drag) it on a corresponding pad 402 or solder mound 404. The user can further adjust the alignment of the electrical component 308 with respect to the pad 302 or the solder mound 304 so as to produce an ideal or correctly "placed" electrical component 308 or an incorrectly placed electrical component 308. Once the "assembly" of the computer-generated virtual VI training board is completed, the user can select the export button 410, which will output the "assembled" virtual VI training board 400 to a database (e.g., database 212). According to one or more non-limiting embodiments of the invention, a multitude (e.g., thousands) of different virtual VI training boards 400 can be generated in the manner described above and stored in a database (e.g., database 212). In this manner, the virtual VI training boards 400 can be utilized to train an AOI AI judgement algorithm and perform artificial intelligence deep learning that facilitates PCB defect inspection without having to wait for an actual faulty board to be identified following a manual inspection.

One or more embodiments described herein can utilize machine learning techniques to perform tasks, such as using visual inspection training boards to perform artificial intelligence deep learning that facilitates PCB defect inspection. More specifically, one or more embodiments described herein can incorporate and utilize rule-based decision making and artificial intelligence (AI) reasoning to accomplish the various operations described herein, namely train an AOI AI judgement algorithm PCB using VI training boards assembled with intended or known defects, and using the VI training boards to perform a PCB defect inspection to detect various PCB defects including, but not limited to, incorrect component placement, missing components, solder misregistrations, solder open defects (also referred to as solder opens), and solder short defects (also referred to a solder shorts). The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used to perform PCB defect inspection which identifies and detect various PCB defects included on a PCB, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of training an AOI AI judgement algorithm PCB using VI training boards assembled with intended or known defects, and using the VI training boards to perform a PCB defect inspection to detect various PCB defects as described herein.

Figure 14:
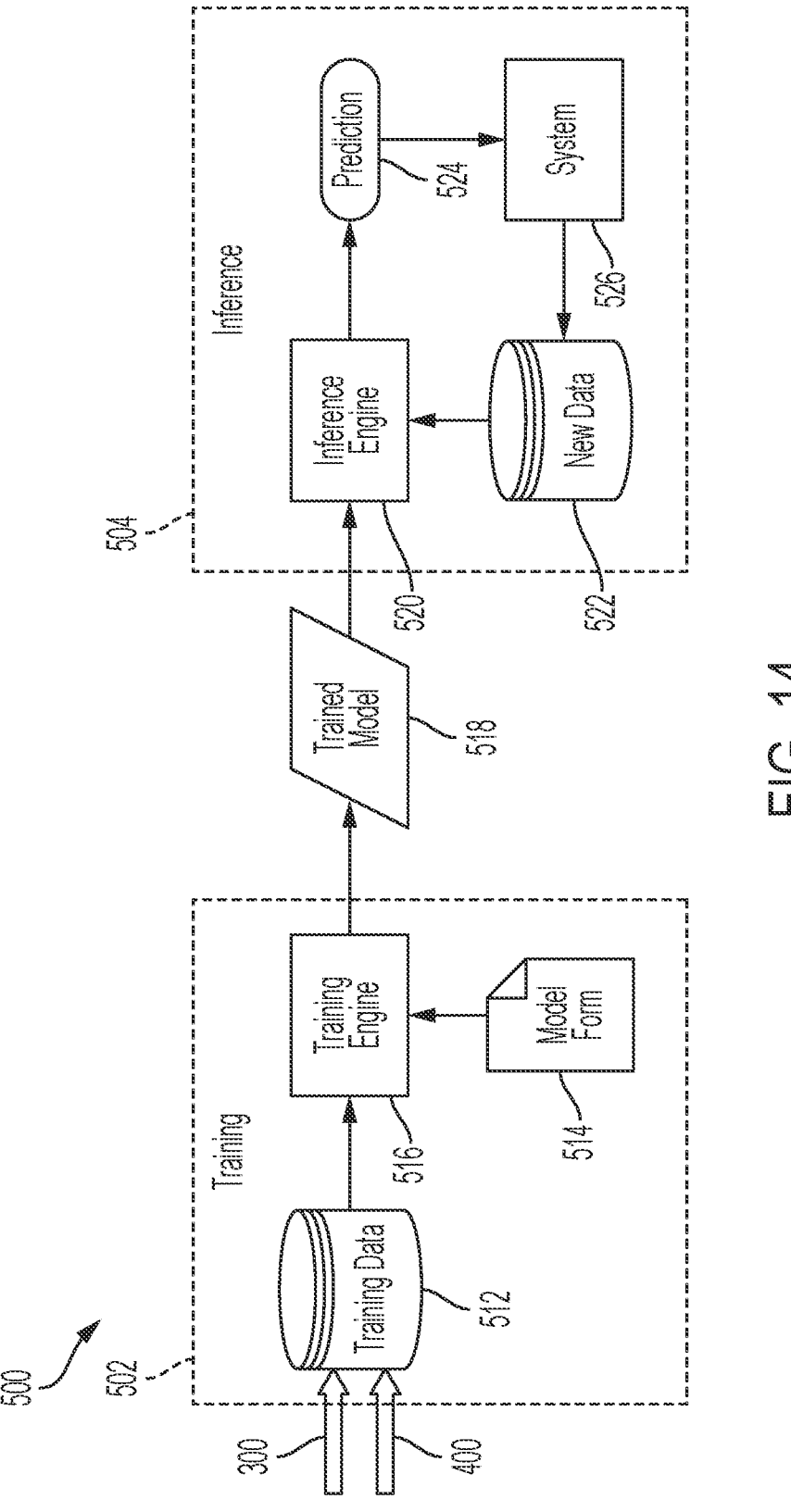
FIG. 14 depicts the computer-generated virtual VI training board show in FIG. 12 after placing electrical components on the solder mounds according to a non-limiting embodiment of the invention.

Systems for training and using a machine learning model are now described in more detail with reference to FIG. 14. Particularly, FIG. 14 depicts a block diagram of components of a machine learning training and inference system 500 according to one or more embodiments described herein. The system 500 performs training 502 and inference 504. During training 502, a training engine 516 trains a model 518 or AI algorithm (e.g., an AOI AI judgement algorithm) to perform a task, such as to train an AOI AI judgement algorithm PCB using VI training boards assembled with intended or known defects, and using the VI training boards to perform a PCB defect inspection to detect various PCB defects. Inference 504 is the process of implementing the trained model 518 to perform the task, such as to identify various elements (e.g., solder, electrical components etc.) of a PCB detect various PCB defects in the context of a larger system (e.g., a system 526). All or a portion of the system 500 shown in FIG. 14 can be implemented, for example by all or a subset of the computing system 100 of FIG. 1 and/or the system of FIG. 2.

The training 502 begins with training data 512, which may be structured or unstructured data. According to one or more embodiments described herein, the training data 512 includes images of a plurality of physically assembled VI training boards 300 and/or computer-generated virtual VI training boards 400. The training engine 516 receives the training data 512 and a model form 514. The model form 514 represents a base model that is untrained. The model form 514 can have preset weights and biases, which can be adjusted during training. It should be appreciated that the model form 514 can be selected from many different model forms depending on the task to be performed. For example, where the training 502 is to train a model to perform image classification, the model form 514 may be a model form of a CNN. The training 502 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 512 includes labeled images, including images of the object of interest with associated labels (ground truth) and other images that do not include the object of interest with associated labels. In this example, the training engine 516 takes as input a training image from the training data 512, makes a prediction for classifying the image, and compares the prediction to the known label. The training engine 516 then adjusts weights and/or biases of the model based on results of the comparison, such as by using backpropagation. The training 502 may be performed multiple times (referred to as "epochs") until a suitable model is trained (e.g., the trained model 518).

Once trained, the trained model 518 (e.g., the trained AOI AI judgement algorithm) can be used to perform inference 504 to perform a task, such as to detect and identify various PCB defects included on a production PCB assembled for customer delivery. The inference engine 520 applies the trained model 518 to new data 522 (e.g., real-world, non-training data). For example, if the trained model 518 is trained to classify images of a particular object, such as a chair, the new data 522 can be an image of a chair that was not part of the training data 512. In this way, the new data 522 represents data to which the model 518 has not been exposed. In one or more non-limiting embodiments, the new data 522 includes production PCBs assembled and delivered from an assembly line and intended for customer delivery. Unlike the VI training boards 300 and 400, any defects that may be included on the production PCBs are unknown and unintentionally produced.

The inference engine 520 makes a prediction 524 (e.g., a classification of an object in an image of the new data 522) and passes the prediction 524 to the system 526 (e.g., the computing system 100 of FIG. 1). The system 526 can, based on the prediction 524, taken an action, perform an operation, perform an analysis, and/or the like, including combinations and/or multiples thereof. In some embodiments, the system 526 can add to and/or modify the new data 522 based on the prediction 524.

In accordance with one or more embodiments, the predictions 524 generated by the inference engine 520 are periodically monitored and verified to ensure that the inference engine 520 is operating as expected. Based on the verification, additional training 502 may occur using the trained model 518 as the starting point. The additional training 502 may include all or a subset of the original training data 512 and/or new training data 512. In accordance with one or more embodiments, the training 502 includes updating the trained model 518 to account for changes in expected input data.

Figure 15:
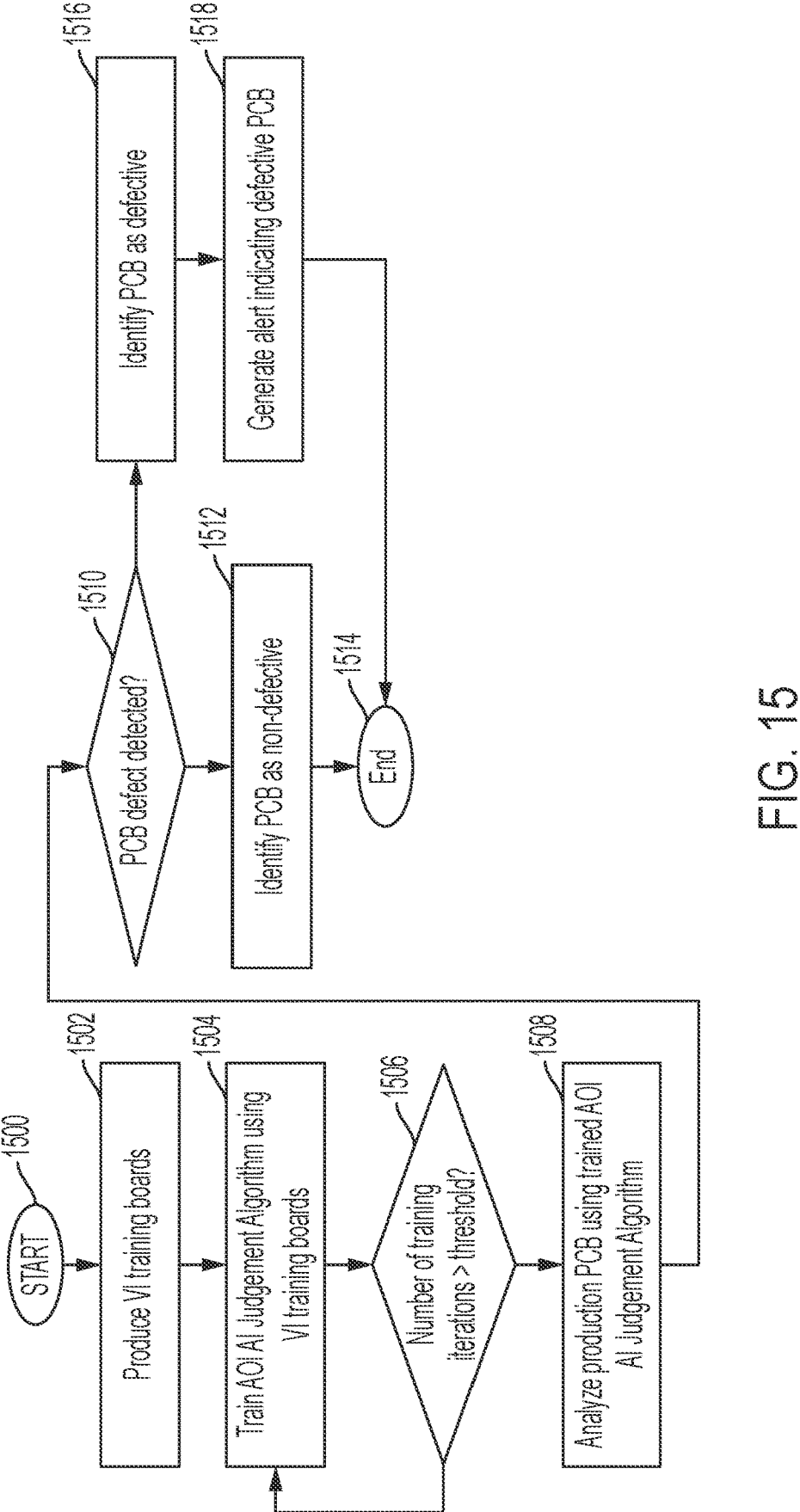
FIG. 15 is a flow diagram illustrating a method of detecting and identifying various PCB defects included on a production PCB using a trained AOI AI judgement algorithm.

Turning now to FIG. 15, a method of detecting and identifying various PCB defects included on a production PCB using a trained AOI AI judgement algorithm is illustrated according to a non-limiting embodiment of the invention. The method begins at operation 1500, and a plurality of VI training boards are produced at operation 1502. The VI training boards can be produced by physically assembling one or more VI training boards and/or computer-generating one or more virtual VI training boards. As described herein, the VI training boards include one or more known or pre-determined defects that are intentionally established when creating the VI training board. The number of VI training boards that can be produced can range, for example, from 1,000 VI training boards to upwards of 100,000 VI training boards. At operation 1504, an AOI AI judgement algorithm is trained using the plurality of VI training boards. In one or more non-limiting embodiments, the training can involve a plurality of training iterations according to, for example, the training 502 described with reference to FIG. 14. At operation 1506, a determination is made as to whether a number of training iterations exceeds a training threshold. When the number training iterations does not exceed the training threshold, the method returns to operation 1504 and continues training the AOI AI algorithm. When, however, the training iterations exceed the training threshold, the method proceeds to operation 1508 and analyzes a production PCB using the trained AOI AI algorithm. Unlike the VI training boards used to train the AOI AI algorithm, any defects that may be included on the production PCBs are unknown and unintentionally produced.

Turning to operation 1510, a determination is made as to whether the production PCB includes one or more defects. When no defects are detected, the production PCB is identified as a non-defective PCB at operation 1512 and the method ends at operation 1514. When, however, a defect on the production PCB is detected, the production PCB board is identified as a defective PCB at operation 1516. Accordingly, an alert can be generated (e.g., output by computing system 100) indicating the defective PCB at operation 1518, and the method ends at operation 1514.

Technical advantages and benefits include methods, systems, and computer program products that allow for performing artificial intelligence deep learning using customized VI training boards that have specific or intentional defects to be detected in production PCBs rather than wait to encounter a faulty board following a manual inspection. The VI training boards can be produced and customized to intentionally include defects including but are not limited to, incorrect component placements, missing components, solder misregistrations, solder open defects and solder short defects. In this manner, an AOI AI algorithm can be quickly trained using specifically targeted defects rather than waiting for a production PCB to include a non-intentionally formed defect that must then be identified and detected (if at all) by a manual inspector. Accordingly, a more precise and efficient PCB defect inspection system can be provided.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

producing a plurality of visual inspection (VI) training boards, each of the visual inspection (VI) training boards including at least one intended defect;

training an artificial intelligence (AI) algorithm implemented in an automatic optical inspection (AOI) system to learn at least one target defect based on the at least one intended defect included in the plurality of VI training boards;

analyzing a production printed circuit board (PCB) using the AOI system;

determining one of a non-defective PCB in response to the AI algorithm determining the production PCB excludes the at least one target defect, or a defective PCB in response to the AI algorithm determining the production PCB includes at least one target defect, wherein the at least one intended defect and the at least one target defect includes one or more of an incorrect component placement, a missing component, solder misregistrations, a solder open defect, and a solder short defect.

2. The computer-implemented method of claim 1, wherein producing the plurality of visual inspection (VI) training boards comprises one or both of assembling a physical VI training board including the at least one intended defect and computer-generating a virtual VI training board including the at least one intended defect.

3. The computer-implemented method of claim 2, further comprising generating, via the AOI system, an alert indicating a detection of the defective PCB.

4. The computer-implemented method of claim 2, wherein the at least one target defect included in the production PCB is unintentionally formed.

5. The computer-implemented method of claim 4, wherein training the AI algorithm comprises:

capturing an image of each physical VI training board among the plurality of VI training boards;

inputting the images of the plurality of VI training boards into a training engine;

assigning a known label to the at least one intended defect included in a given physical VI training board among the plurality of VI physical boards;

making a prediction for classifying the images of the plurality of VI physical training boards based on the known label;

comparing the prediction to a base model image of a PCB that excludes the at least one intended defect; and updating the AI algorithm based on results of the comparison.

6. The computer-implemented method of claim 4, wherein training the AI algorithm comprises:

inputting images of the virtual VI training board among the plurality of VI training boards into the training engine;

assigning a known label to the at least one intended defect included in a given virtual VI training board among the plurality of VI training boards;

making a prediction for classifying the images of the plurality of VI virtual training boards based on the known label;

comparing the prediction to a base model image of a PCB that excludes the at least one intended defect; and updating the AI algorithm based on results of the comparison.

7. A computing system comprising:

a database configured to receive images of a plurality of visual inspection (VI) training boards, each of the visual inspection (VI) training boards including at least one intended defect;

an automatic optical inspection (AOI) system including an artificial intelligence (AI) algorithm implemented in an automatic optical inspection (AOI) system, the automatic optical inspection (AOI) system configured to:

train the artificial intelligence (AI) algorithm to learn at least one target defect based on the at least one intended defect including in the plurality of VI training boards;

analyze a production printed circuit board (PCB); and determine either a non-defective PCB in response to the AI algorithm determining the production PCB excludes the at least one target defect, or a defective PCB in response to the AI algorithm determining the production PCB includes at least one target defect, wherein the at least one intended defect and the at least one target defect includes one or more of an incorrect component placement, a missing component, solder misregistrations, a solder open defect, and a solder short defect.

8. The computing system of claim 7, wherein the plurality of visual inspection (VI) training boards comprises assembling a physical VI training board including the at least one intended defect and/or a computer-generated virtual VI training board including the at least one intended defect.

9. The computing system of claim 8, wherein the AOI system generates an alert indicating a detection of the defective PCB.

10. The computing system of claim 9, wherein the at least one target defect included in the production PCB is unintentionally formed.

11. The computing system of claim 10, wherein the AOI system trains the AI algorithm by performing the operations of:

capturing an image of each physical VI training board among the plurality of VI training boards;

inputting the images of the plurality of VI training boards into a training engine;

assigning a known label to the at least one intended defect included in a given physical VI training board among the plurality of VI physical boards;

making a prediction for classifying the images of the plurality of VI physical training boards based on the known label;

comparing the prediction to a base model image of a PCB that excludes the at least one intended defect; and updating the AI algorithm based on results of the comparison.

12. The computing system of claim 10, wherein the AOI system trains the AI algorithm by performing the operations of:

inputting images of the virtual VI training board among the plurality of VI training boards into the training engine;

assigning a known label to the at least one intended defect included in a given virtual VI training board among the plurality of VI training boards;

making a prediction for classifying the images of the plurality of VI virtual training boards based on the known label;

comparing the prediction to a base model image of a PCB that excludes the at least one intended defect; and updating the AI algorithm based on results of the comparison.

13. A computer program product to control computing system to use visual inspection training boards to perform artificial intelligence deep learning, the computer program product comprising a computer readable storage medium having program instructions embodied therewith, the program instructions executable by an electronic computer processor to the computing system to perform operations comprising:

producing a plurality of visual inspection (VI) training boards, each of the visual inspection (VI) training boards including at least one intended defect;

training an artificial intelligence (AI) algorithm implemented in an automatic optical inspection (AOI) system to learn at least one target defect based on the at least one intended defect included in the plurality of VI training boards;

analyzing a production printed circuit board (PCB) using the AOI system;

determining one of a non-defective PCB in response to the AI algorithm determining the production PCB excludes the at least one target defect, or a defective PCB in response to the AI algorithm determining the production PCB includes at least one target defect, wherein the at least one intended defect and the at least one target defect includes one or more of an incorrect component placement, a missing component, solder misregistrations, a solder open defect, and a solder short defect.

14. The computer program product of claim 13, wherein producing the plurality of visual inspection (VI) training boards comprises one or both of assembling a physical VI training board including the at least one intended defect and computer-generating a virtual VI training board including the at least one intended defect.

15. The computer program product of claim 14, further comprising generating, via the AOI system, an alert indicating a detection of the defective PCB.

16. The computer program product of claim 14, wherein the at least one target defect included in the production PCB is unintentionally formed.

17. The computer program product of claim 16, wherein training the AI algorithm comprises:

capturing an image of each physical VI training board among the plurality of VI training boards;

inputting the images of the plurality of VI training boards into a training engine;

assigning a known label to the at least one intended defect included in a given physical VI training board among the plurality of VI physical boards;

making a prediction for classifying the images of the plurality of VI physical training boards based on the known label;

comparing the prediction to a base model image of a PCB that excludes the at least one intended defect; and updating the AI algorithm based on results of the comparison.

18. The computer program product of claim 16, wherein training the AI algorithm comprises:

inputting images of the virtual VI training board among the plurality of VI training boards into the training engine;

assigning a known label to the at least one intended defect included in a given virtual VI training board among the plurality of VI training boards;

making a prediction for classifying the images of the plurality of VI virtual training boards based on the known label;

comparing the prediction to a base model image of a PCB that excludes the at least one intended defect; and updating the AI algorithm based on results of the comparison.

* * * * *